United States Patent
Qiang et al.

(10) Patent No.: US 11,360,671 B2
(45) Date of Patent: Jun. 14, 2022

(54) REGION-SPECIFIC DIRECTED OFFLINE SCAN FOR HARD DISK DRIVE

(71) Applicant: Seagate Technology LLC, Fremont, CA (US)

(72) Inventors: Jian Qiang, Singapore (SG); Jose Mari Toribio, Singapore (SG); Teck Khoon Lim, Singapore (SG); Wenxiang Xie, Singapore (SG); Xiong Liu, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 26 days.

(21) Appl. No.: 16/935,527

(22) Filed: Jul. 22, 2020

(65) Prior Publication Data

US 2022/0027056 A1    Jan. 27, 2022

(51) Int. Cl.
*G06F 3/06* (2006.01)
*G06F 11/07* (2006.01)

(52) U.S. Cl.
CPC .......... *G06F 3/0616* (2013.01); *G06F 3/0619* (2013.01); *G06F 3/0653* (2013.01); *G06F 3/0676* (2013.01); *G06F 11/076* (2013.01); *G06F 11/0793* (2013.01)

(58) Field of Classification Search
CPC .................................................. G06F 3/0616
USPC ......................................................... 711/154
See application file for complete search history.

(56) References Cited

U.S. PATENT DOCUMENTS

| | | | |
|---|---|---|---|
| 7,318,088 B1* | 1/2008 | Mann ...................... | G06F 9/445 709/221 |
| 8,023,215 B1 | 9/2011 | Ghaly et al. | |
| 9,502,061 B1* | 11/2016 | Zhu ................. | G11B 20/10453 |
| 9,672,845 B2 | 6/2017 | Rausch | |
| 9,916,849 B1 | 3/2018 | Mader et al. | |
| 2007/0074083 A1* | 3/2007 | Olds ...................... | G06F 11/008 714/54 |
| 2008/0130154 A1* | 6/2008 | Mettler .................... | G11B 5/09 360/53 |
| 2009/0244775 A1* | 10/2009 | Ehrlich .............. | G11B 20/1217 360/135 |
| 2011/0075290 A1* | 3/2011 | Hobbet .................... | G11B 5/09 360/55 |
| 2011/0149427 A1* | 6/2011 | Cheng ................... | G11B 5/012 360/69 |
| 2011/0252189 A1* | 10/2011 | Kang ..................... | G11C 29/42 711/103 |
| 2013/0254509 A1* | 9/2013 | Patil ....................... | G06F 3/064 711/170 |
| 2014/0101369 A1* | 4/2014 | Tomlin ................ | G06F 12/0246 711/103 |

* cited by examiner

*Primary Examiner* — Titus Wong
(74) *Attorney, Agent, or Firm* — Mueting Raasch Group

(57) ABSTRACT

An adjacent track interference (ATI) metric is determined for each of a plurality of regions of a single surface of a magnetic disk. Based on the ATI metrics, each of the regions is assigned a region-specific directed offline scan (DOS) criterion, at least two of the DOS criteria being different from one another. Based on a write count of a track within one of the regions satisfying the associated region-specific DOS criterion, a DOS remediation of the track is performed.

18 Claims, 7 Drawing Sheets

REGION-SPECIFIC DIRECTED OFFLINE SCAN FOR HARD DISK DRIVE

SUMMARY

The present disclosure is directed to a region specific directed offline scan for a hard disk drive. In one embodiment, an adjacent track interference (ATI) metric is determined for each of a plurality of regions of a single surface of a magnetic disk. Based on the ATI metrics, each of the regions is assigned a region-specific directed offline scan (DOS) criterion, at least two of the DOS criteria being different from one another. Based on a write count of a track within one of the regions satisfying the associated region-specific DOS criterion, a DOS remediation of the track is performed.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
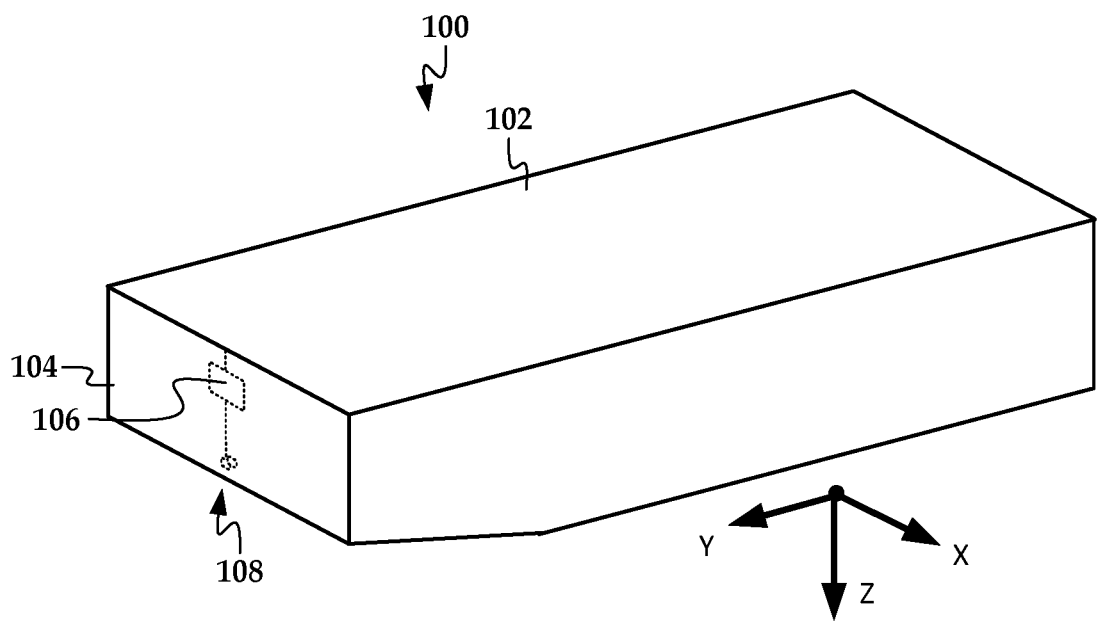
FIG. 1 is a perspective view of a slider assembly according to an example embodiment.

The present disclosure generally relates to data storage devices that utilize magnetic storage media, e.g., magnetic disks. For example, a hard disk drive (HDD) unit contains one or more magnetic disks that are written to and read from using a magnetic read/write head attached to the end of an arm that is positioned over tracks in the disk. To record data, the read/write head generates magnetic fields using a magnetic coil, the fields being directed to the magnetic disk surface via a write pole. To read data, the read/write head senses changes in magnetic field via a sensor such as a magneto-resistive stack that is held proximate to the moving disk. A disk drive typically has multiple heads, one for each disk surface.

A disk drive that uses just the write coil and write pole to record data is sometimes referred to as a conventional magnetic recording (CMR) drive. Modern CMR drives often employ perpendicular magnetic recording (PMR), in which the magnetic fields are aligned perpendicularly to the disk surface. This allows for higher areal density (AD) compared to schemes where the fields are parallel to the disk surface. Some drives may employ additional means to increase AD, such as shingled magnetic recording (SMR) in which adjacent tracks are layered upon one another during writing.

Other technologies employed to increase AD include heat-assisted magnetic recording (HAMR) and microwave-assisted magnetic recording (MAMR). These technologies use additional components (e.g., laser for HAMR and spin-torque oscillator for MAMR) to affect the size of the recorded hotspot such that smaller bits can be written to the disk compared to a CMR drive.

Whatever technology is used to record data to a magnetic disk, there is a desire to increase AD such that an individual magnetic disk can store larger amounts of data. Because the data is typically written on circular tracks, increased AD often results in narrower tracks and correspondingly narrower spacing between adjacent tracks. This increases the possibility of adjacent track interference (ATI), in which the signals from one track "bleed" over to an adjacent track. If a track is written and rewritten many times, this can lead to loss of data on adjacent tracks that have not been written to for a long period of time.

In some drives, a process known as directed offline scan (DOS) is used to counteract the effects of ATI. Generally, this involves tracking the number of times a portion of the disk (e.g., zone, track) is written and initiating a remedial action if the write activity is such that it affects data that is physically close to the written tracks. For example, a DOS counter may count the number of times a track is written, and if this count exceeds a threshold, adjacent tracks that were not written or rewritten during the count interval may be examined to see if there has been degradation. For example, the identified tracks may be read back using minimal correction effort (e.g., limited number of iterations of an error correction decoder). If this read back indicates degradation above some level (e.g., failure to converge, confidence of data is below some level), the track can be refreshed. The refresh may involve at least reading the track data (e.g., using more intensive error correction efforts) and rewriting it on the same track to ensure it remains viable over the long term. This examination and possible refresh of the track after experiencing a threshold number of adjacent writes will be referred to herein as DOS remediation.

The use of a DOS procedure can be an effective way to ensure long term viability of stored data. However, there is a trade off in that DOS activities consume resources such as memory and availability of the drive to service host requests. These issues may have more impact as AD increases, because higher AD generally involves an increase in the number of tracks and therefore a potentially proportional impact to drive performance in order to service DOS remediation. Such impacts may be more apparent over time as the drive fills up with data. In embodiments described below, a DOS scheme may be implemented that reduces the impact of DOS on high AD drives.

In reference now to FIG. 1, a perspective view shows a read/write head 100 according to an example embodiment. The read/write head 100 may be used in a magnetic data storage device, e.g., hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 may be a CMR head, or may be configured as a HAMR or MAMR device. In the latter case, the head includes additional components that assist the read/write transducer 108 during recording. These components are generally indicated by block 106 and may include a laser diode and a waveguide in a HAMR implementation, or a spin-torque oscillator for a MAMR device. Note that the general concepts described herein related to DOS counts can be implemented in any of a CMR or other recording device.

Figure 2:
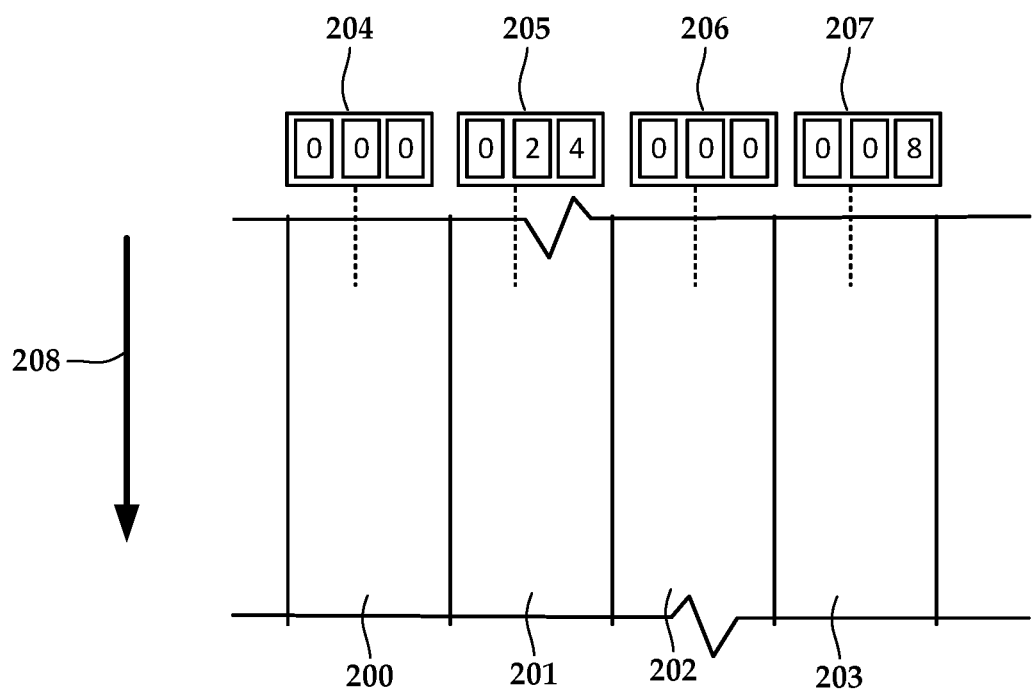
FIG. 2 is a diagram of recorded tracks and counters according to an example embodiment.

In FIG. 2, a diagram shows an example of DOS operations according to an example embodiment. Portions of adjacent tracks 200-203 are represented as rectangular regions, with data being written the tracks 200-204 in a downtrack direction 208. The tracks 200-203 may be divided into sectors and include other data such as servo marks, however the present example does not depend on any particular track format or data. Counters 204-207 are schematically illustrated, each counter 204-207 being associated with one of the tracks. When each track 200-203 is written, its associated counter 204-207 is incremented.

In this example, the counters 204-207 indicate a number of writes that have occurred on the track. In other embodiments, the counters 204-207 may be incremented by a value different than one, e.g., greater than one. For example, if the counters were incremented by four, counter 205 would indicate eight writes and counter 207 would indicate two writes. In this example, track 201 has been written 24 times while adjacent tracks 200, 202 have not been written, at least not since a last reset of the counters 204-206. The value of counter 205 may trigger a refresh of tracks 200, 202 if the DOS threshold is less than or equal to 24. It will be understood that other counting schemes may be used. For example, track N may have two counters N−1, N+1 that indicate how often its adjacent tracks N−1 and N+1 have been written since track N was written. If either counter N−1 or N+1 exceeds the counter threshold, then track N undergoes remediation during a subsequent DOS operation, and the counters may be reset.

Regardless of how the writes are counted, the system will perform a remediation operation on affected tracks, e.g., reading and possibly rewriting the data stored on one or more adjacent tracks 200, 202 when counter 205 exceeds a threshold. As AD increases, these media scan/track repair operations may be become more aggressive, e.g., triggering remediation more often due to closer track spacing which increases ATI. This may be exacerbated by an increase in the total number tracks, which will tend to increase the time spent on DOS remediation as the drive's utilization increases.

One scheme to reduce the number of time DOS remediation occurs is to recognize that different parts of the recording media may have different ATI sensitivity. For example, each recording head can access a single disk surface, and each recording head may have different sensitivity to ATI, e.g., due to variations in the head geometry. Therefore, each head may have a different DOS criterion that triggers remediation. This DOS criterion can be determined in an ATI factory test of the assembled drive, and the results written to a drive configuration database for use in the fielded unit. As will be described in detail below, some embodiments employ a more fine grained application of DOS criterion.

For purposes of this disclosure, the term "DOS criterion" is used to indicate the sensitivity of tracks to ATI that triggers when DOS remediation will occur. There are at least two ways to affect when DOS remediation is triggered. One way is to use a same counter increment per write for all tracks and use different DOS thresholds to trigger remediation for different regions. Another way is to use a same DOS threshold for all tracks but use differently weighted counters for different regions, such that, for the same number of writes, some tracks reach the same DOS threshold faster than others. It may also be possible to use both different DOS counters and different DOS thresholds for different regions.

Generally, DOS criterion directly relates to ATI capability. For example, a higher DOS criterion means that a track is less sensitive to ATI (higher ATI capability) and it will take more adjacent track writes to trigger DOS. This may be implemented by using a higher DOS threshold and/or a lower DOS counter increment. Similarly, a lower DOS criterion means that a track is more sensitive to ATI (lower ATI capability) and will take fewer adjacent track writes to trigger DOS. This may be implemented by using a lower DOS threshold and/or a higher DOS counter increment. Specific examples below may show changing one of a threshold or a counter weight/increment to change DOS criterion, however it will be understood that an equivalent change in DOS criterion can be achieved either way and the specific embodiments are not necessarily limited to the illustrated techniques.

This disclosure may use terms "poorer/better," "lower/higher," etc. as applied to ATI performance, DOS criteria, and the like. These terms are meant to imply a relative ranking as compared to one another, e.g., a first region may have poorer ATI performance than a second region, thus a track the first region will have DOS remediation performed after fewer adjacent track writes compared to a track in the second region. It may be assumed that there is some average value of ATI performance, DOS criterion, etc., such that the "poorer" or "lower" value will be below the average and the "better" or "higher" value will be above or equal to the average. A numerical scale can be used to quantify these relative values in specific implementations; however, such quantification is not required for an understanding of the disclosed embodiments.

Figure 3:
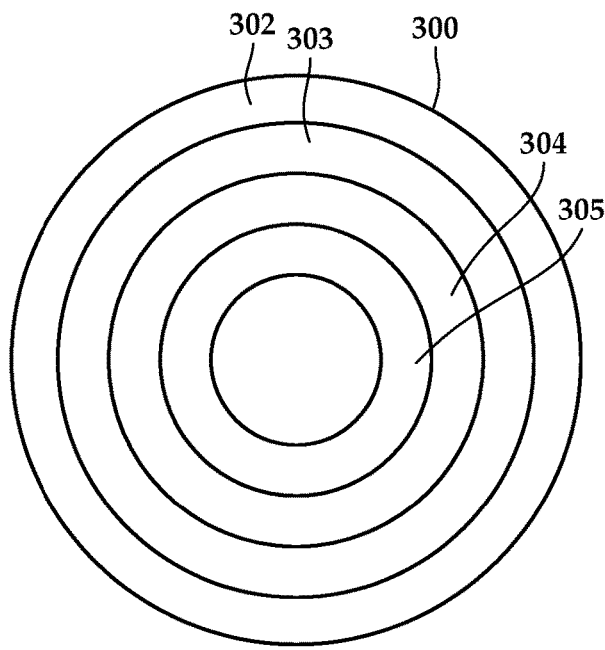
FIG. 3 is a diagram of an arrangement of disk zones according to an example embodiment.

The ATI testing for each recording head may be performed over different zones of the disk surface to determine ATI metrics, e.g., crosstalk. Hard drives generally use different radially defined zones on each surface to account for the fact that the outer tracks move faster than the inner tracks, and therefore are written using different writing frequencies. An example of disk zones is shown in FIG. 3, in which four zones 302-305 are shown on the surface of a disk 300. The number and relative sizes of the zones in actual disk drives may vary from what is shown in FIG. 3 (typically many more zones per disk surface), but generally the zones are ring-shaped and located at different radii of the disk surface.

When performing the ATI factory test, a subset of the zones may be selected and tested, e.g., by writing adjacent tracks with test data and measuring ATI metrics such as bit error rate (BER) or some other indicator of data integrity. The zone with the worst performance may be used to set the DOS criterion for the head. There may be a number of reasons that some zones have better ATI performance than others, such as skew angle between the recording head and the track, quality of the recording medium, differences in head geometry and head alignment, etc.

Figure 4:
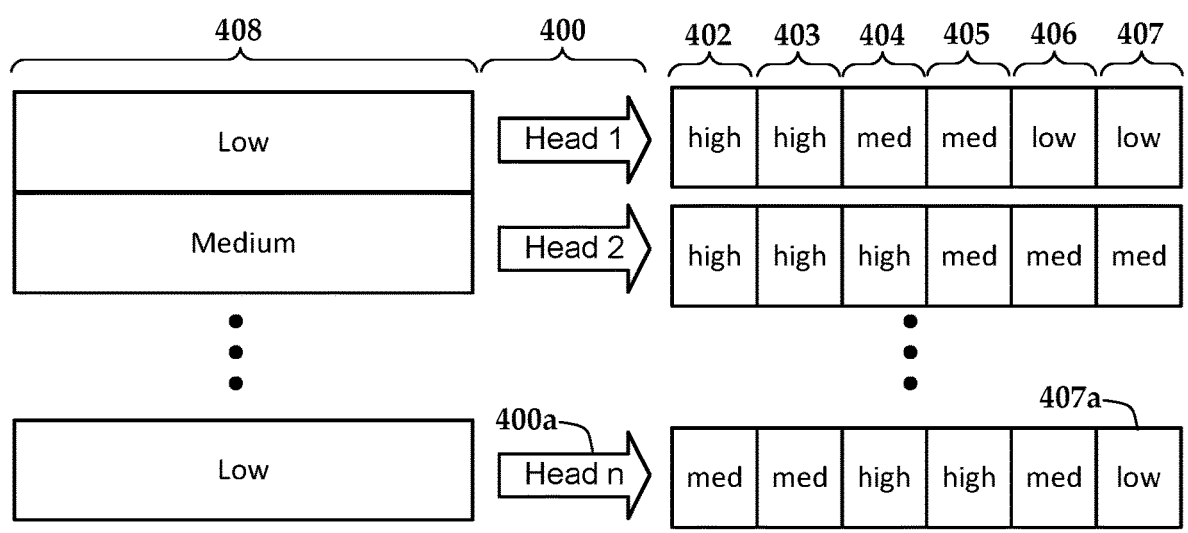
FIG. 4 is a diagram showing different adjacent track interference capabilities of different zones according to an example embodiment.

In FIG. 4, a block diagram shows an example of how ATI capability may be distributed on a drive according to an example embodiment. Each head 400 writes to respective zones 402-407 on a disk surface associated with each head 400. The illustrated zones 402-407 may represent a subset of the total disk zones, e.g., not all disc zones need to be tested and characterized. Within each block representing the zones 402-407 is an indicator of ATI capability (or DOS criterion), which is "low," "medium," and "high" in this simplified example.

Blocks 408 represent one scheme where the lowest ATI performance for each of the zones 402-407 is assigned to each head. For example, head 400a is ranked as low ATI performance due to zone 407a being ranked low. The DOS criterion for these zones would be set appropriately, e.g., a low DOS criterion for low ATI performance. During drive operation in this scheme, the DOS remediation (e.g., reading and optionally refreshing data on track) scan starts whenever write count (either weighted or unweighted) for a track accessed by the head is greater than or equal to the DOS threshold, regardless of the zone location within the disk surface accessed by the head.

As indicated in FIG. 4, some zones 402-407 accessed by a head have better ATI capability and can be set to a higher DOS criterion than the worst zone accessed by the head. This means that, in the schemed described above and represented by blocks 408, some regions may be performing significantly more DOS remediation than is necessary for the disc surface as a whole. Thus, in one embodiment, each of the zones 402-407 may use the different DOS criteria instead of single per-head criterion. Thus the ATI capability indicated within each of the blocks 402 represents a region-specific DOS criterion that can be used instead of the criteria indicated by blocks 408. Note that the DOS criterion may apply to individual zones or to zone groups. For purposes of the following discussion, the term "region" may be used analogously to "zone groups."

Using FIG. 4 as an example, if there were 24 zones on the disk surface, then the six zones 402-407 for each head may be representative of six zone groups (or regions), each zone group or region having four zones. Each zone group may have a different DOS criterion, and each zone within the zone group would have the same DOS criterion. The DOS criterion within each zone group could be set in a number of ways. For example, if zone 407a is the only zone tested within its group, then all four zones may be set to "low" DOS criterion. Alternatively, if the other three zones grouped with zone 407a are also tested and have a higher ATI capability, the zone may still be assigned to a "low" DOS criterion, which corresponds to the lowest performing zone within the zone group.

Figure 5:
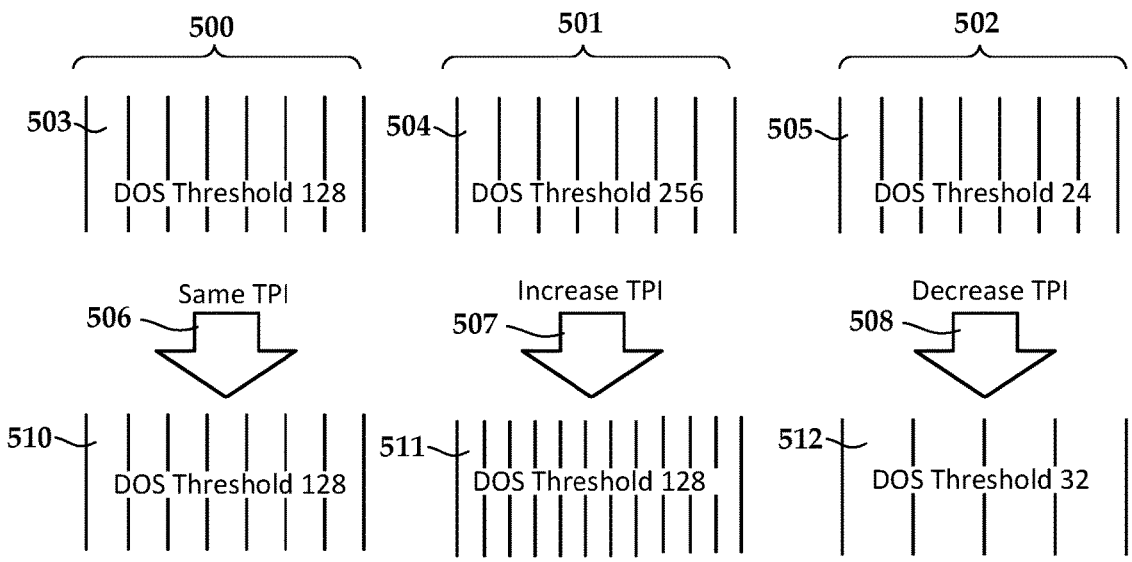
FIG. 5 is a diagram showing the adjustment of track density based on adjacent track interference capabilities in different zones according to an example embodiment.

Note that allowing different zones/regions to have different DOS criteria can allow for tuning of track spacing (commonly referred to as tracks-per-inch, or TPI) for each zone. An example, of this is shown in FIG. 5, which shows before and after TPI and DOS criterion settings for three different disk regions 500-502 according to an example embodiment. In this example the DOS criteria is indicated by the use of different DOS thresholds, however a similar result can be obtained by changing counter increments/weights. Configurations 503-505 represent performance of three different regions 500-501 (or zone groups) with the same initial TPI, but where ATI testing results in different DOS thresholds. These configurations 503-505 may be an initial configuration using a nominal TPI for the head, for example.

After initially characterizing the ATI performance for each region 500-502, reconfigurations may be performed as indicated by arrows 506-508. For purposes of this example, a target DOS threshold between 32 and 128 is assumed, e.g., it is desired that all zones/regions lie within this threshold. Thus region 500 is within this threshold and arrow 506 indicates no change, so a new configuration 510 for region 500 is the same as the original configuration 503. Region 501 has a DOS threshold higher than the top of the target range, and so arrow 507 indicates an increase in TPI. The new configuration 511 for region 501 has higher TPI than configuration 504 and a lower DOS threshold of 128. Region 502 has a DOS threshold less than the bottom of the target range, and so arrow 508 indicates a decrease in TPI. The new configuration 512 for region 502 has lower TPI than configuration 505 and a higher DOS threshold of 32.

As shown in FIG. 5, the minimum DOS criterion can be raised for the lowest performing zones by decreasing TPI, which will lead to a decrease in areal density for those zones/regions. However, other zones/regions whose ATI performance is better than needed for purposes of DOS criteria can be reconfigured to have increased areal density, thus compensating for the loss of areal density in the poorer performing zones. Generally, this allows reducing the overall frequency of DOS scans while still maintaining overall target ADC.

Figure 6:
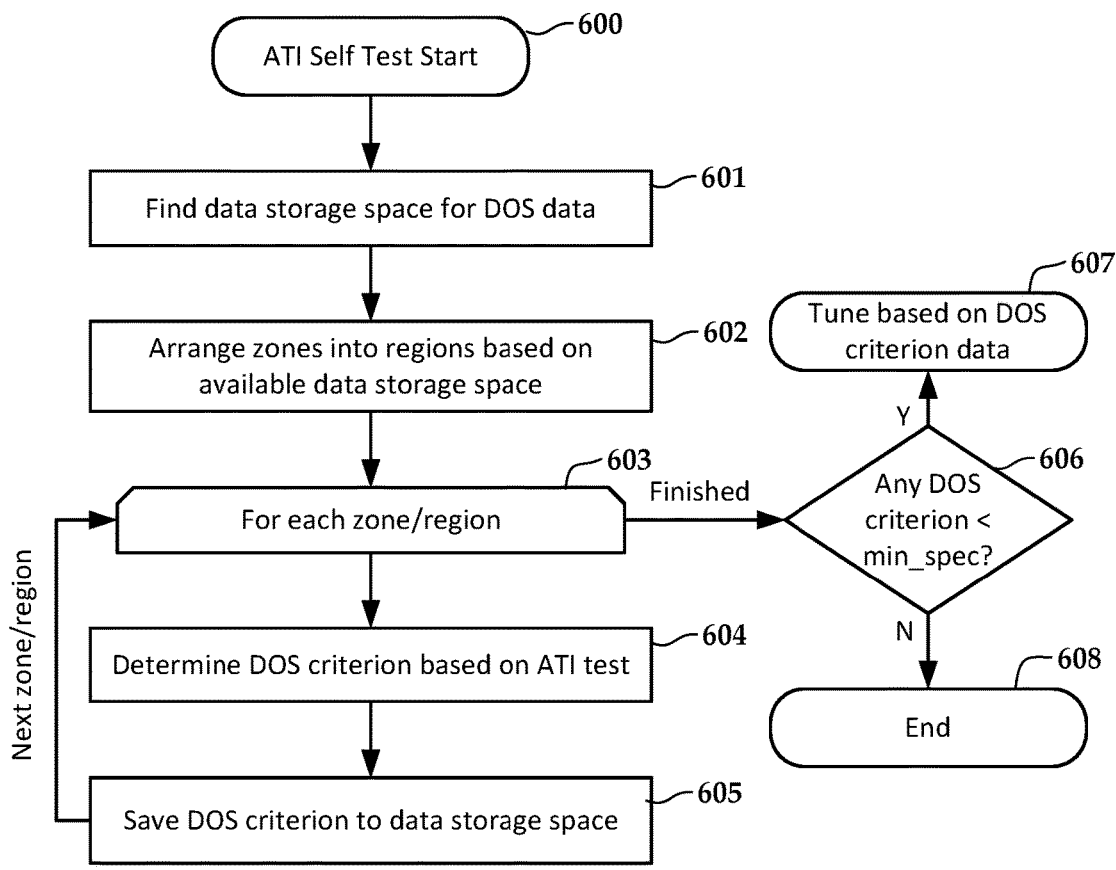
FIGS. 6-8, 9A and 9B are flowcharts of methods according to example embodiments.

In FIG. 6, a flowchart shows a procedure 600 for initial setting of DOS criteria according to an example embodiment. This procedure 600 may be performed during configuration of a drive in the factory, although in some cases may be performed on fielded drives, e.g., reconfiguration, reformatting, etc. A persistent storage space is found 601 for the DOS configuration data. This space may be a reserved portion of the disk drive and/or some other non-volatile memory, e.g., flash memory, and the size of the data depends on the total number of regions with individualized DOS criteria. The zones of the disks are arranged 602 into regions based on the available disk storage space and other factors, e.g., number of individualized DOS-criterion-regions, total number of disk zones, etc.

Block 603 represents an entry into a loop that iterates through each region that was defined at 602. Block 604 represents a test of ATI that determines DOS criterion. For example, the test 604 may involve writing three adjacent tracks using a first test tone (or set of tones) for the outer track and a second test tone at the inner track. The inner track is read back and a magnitude of the first test tone frequency (or frequencies) that leaked from the adjacent tracks is determined and used as an ATI metric. The higher the magnitude of the first frequency the lower the ATI performance, and vice versa. Other ways of measuring ATI performance metrics may be used, e.g., using random data or tones for writing adjacent track and determining BER of the center tracks, the ATI performance and DOS criterion being inversely related to the BER.

Figure 7:
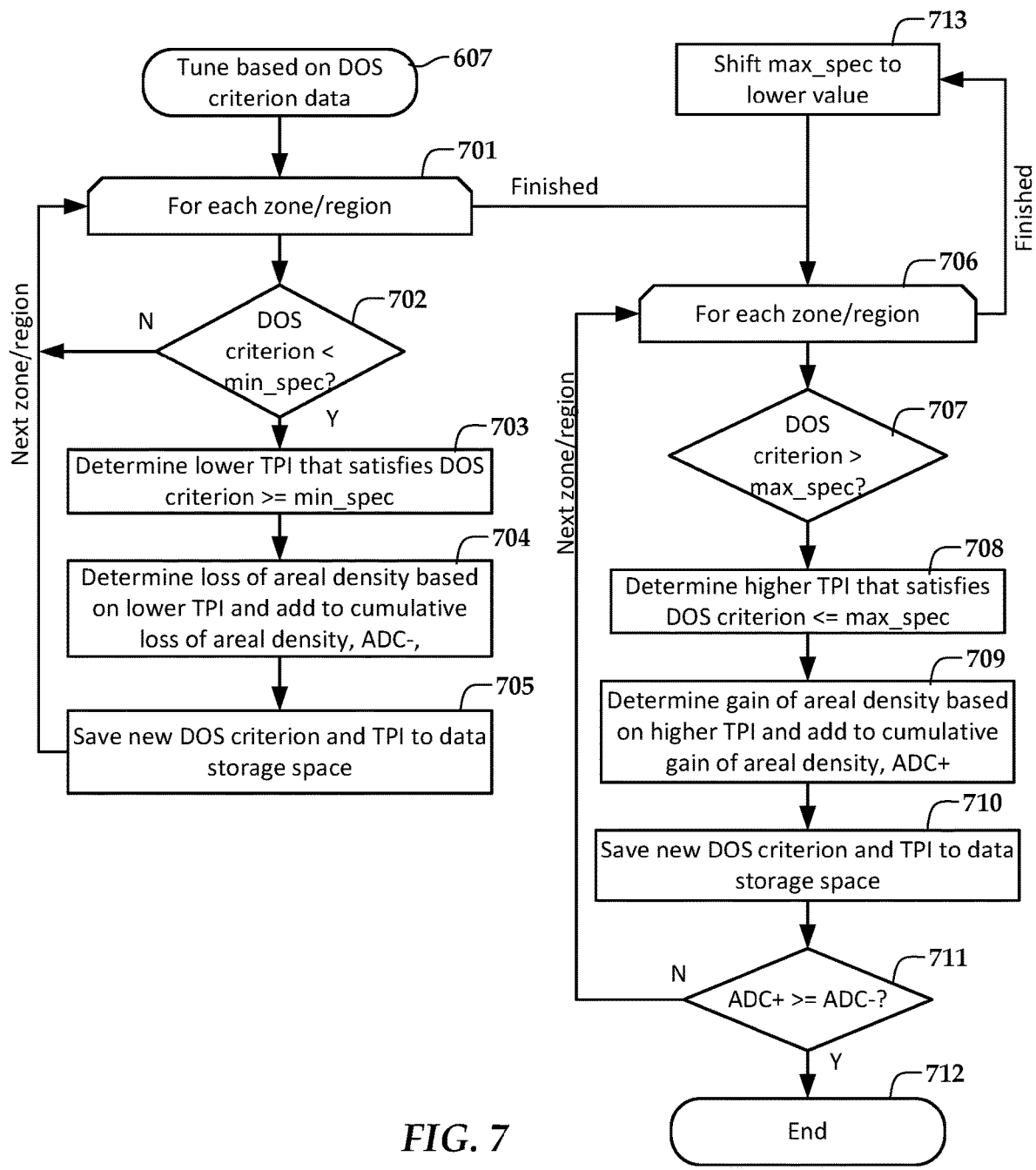

The DOS criterion determined at 604 is saved 605 and the process repeated for the rest of the zones via block 603. When the iteration is finished, control goes to block 606, which determines if any of the saved DOS criteria are below a minimum specification value. If any of the DOS criteria are below specification (block 606 returns 'yes'), a procedure 607 for tuning the regions to increase DOS criterion is performed, an example of which is shown in FIG. 7. Otherwise, if all DOS criteria are within specification, the procedure 600 is complete 608.

In FIG. 7, a flowchart shows a method 607 of tuning the different regions of the disk based on the DOS criterion data, e.g., that was gathered in the process shown in FIG. 6. Note, that in FIG. 6, block 607 was entered if at least one region had a DOS criterion that was below a system-defined minimum. In FIG. 7, block 701 is an entry point for iterating through all of the zones/regions, and block 702 returns 'yes' for any of those regions whose DOS criterion was below specification. For those regions, a new, lower TPI is determined 703 that enables the DOS criterion to be at or above the minimum value specified. This will result in a loss of areal density capacity (ADC) for the region, and this amount is determined 704 added to a cumulative value, ADC−. The new DOS criterion and TPI for the regions are saved 705 and the loop 701 iterates through the next region.

Once all of the regions have been processed (block 701 exits with "finished"), another loop is entered at block 706, which again iterates through all of the regions. In this case, block 707 returns 'yes' for any region that has a DOS criterion that is above the maximum specification limit. For these regions, a higher TPI is determined 708 that enables the DOS criterion to be at or below the maximum value specified. This will result in a gain of ADC for the region, and this amount is determined 704 added to a cumulative value, ADC+. The new DOS criterion and TPI for the region is saved 710.

The value of ADC+ is compared at block 711 to previous cumulative value ADC−, and if ADC+>=ADC−, the drive will meet target ADC, thus block 711 returns 'yes' and the procedure is complete 712. Note that the loop defined by block 706 may complete without block 711 returning 'yes,' in which case not enough ADC was gained by retuning the regions with high ATI performance. One solution to this is shown by block 713, in which the maximum DOS criterion is lowered, after which loop 706 is entered again and presumably will recapture more ADC as more regions should be above this new maximum value and will continue to increase the value of ADC+.

Figure 8:
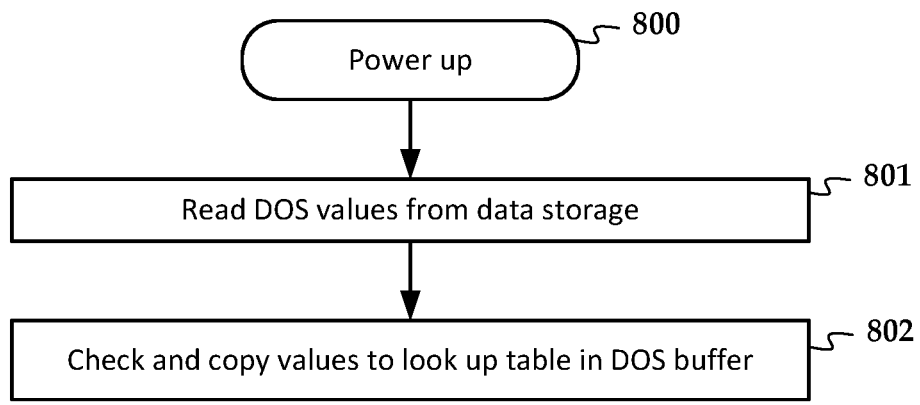
Figure 9A:
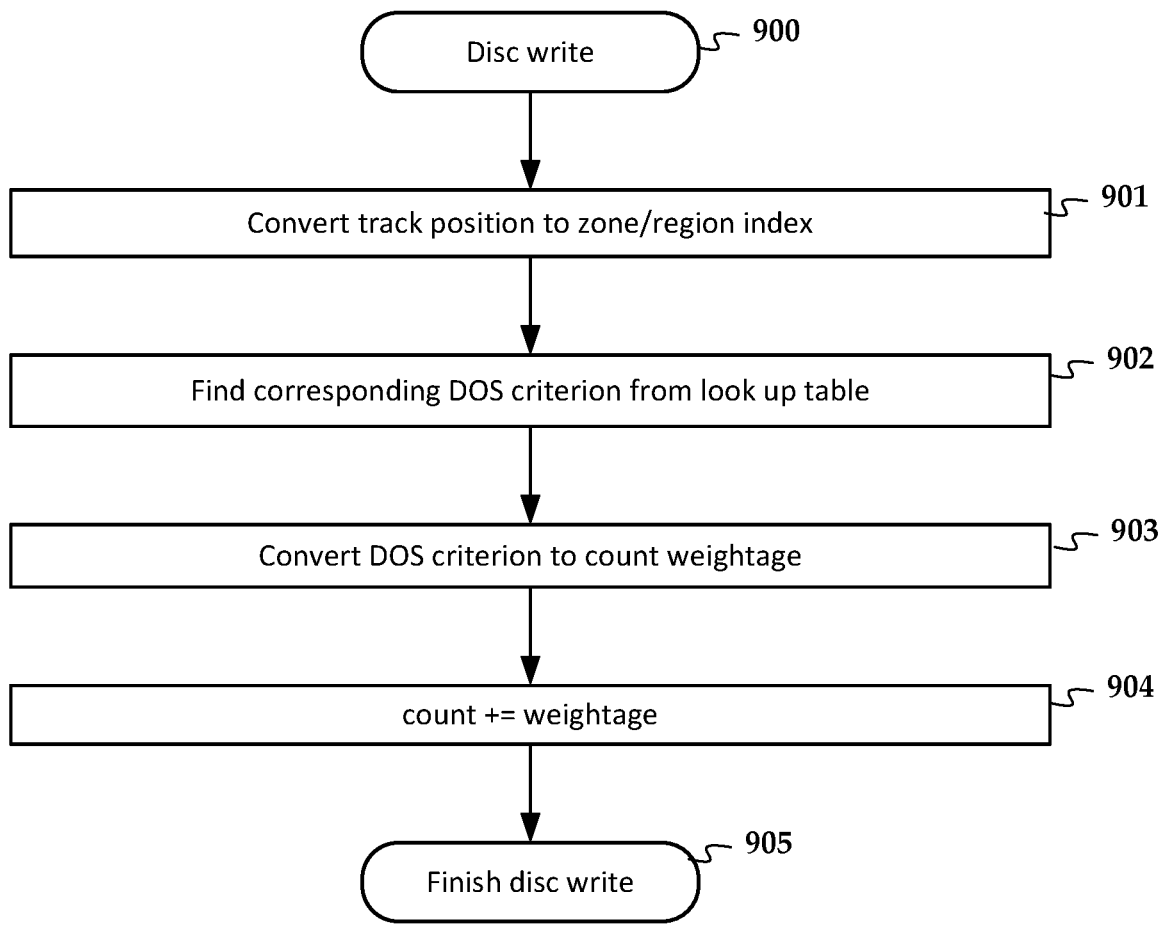
Figure 9B:
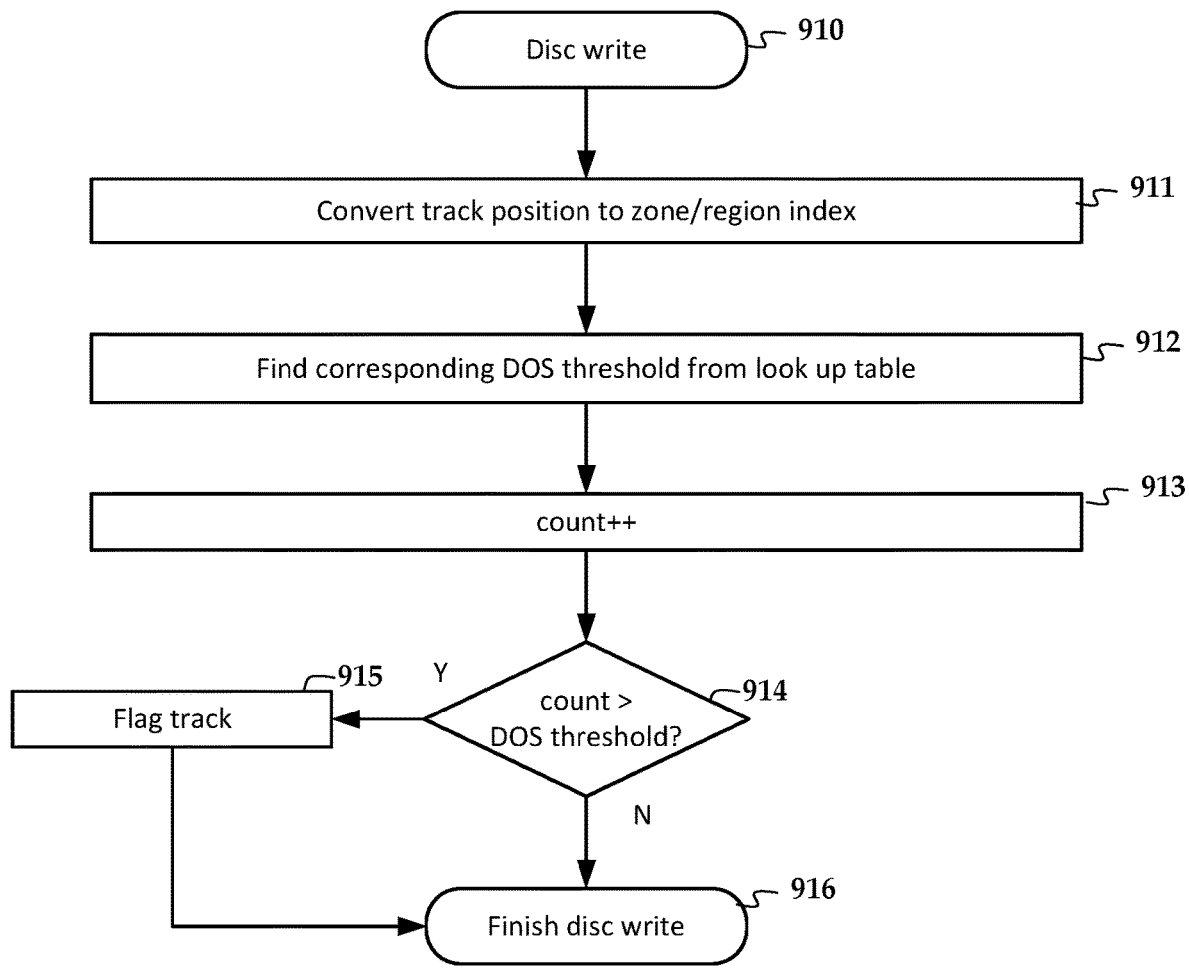

Once the DOS criteria have been set and recorded for all the regions, the data are used during the life of the drive to track writes and occasionally perform remediation such as re-reading and possibly refreshing track data. In FIGS. 8, 9A, and 9B, flowcharts show methods that can be used in a drive according to example embodiments. The method in FIG. 8 occurs after power up 800, after which DOS values are read 801 from storage. These values are checked 802 and copied into a buffer (e.g., volatile memory) to be used as a look up table or equivalent data structure, e.g., binary tree.

The method shown in FIG. 9A occurs in response to a disc write 900 operation. The write 900 is targeted for a logical block address range, which will correspond to one or more target tracks. Each target track position is converted 901 to a zone/region index. This index is used to find 902 the DOS criterion from the lookup table that was created at block 802 in FIG. 8. The DOS criterion is converted 903 to a count weightage, and a currently stored count associated with the track is incremented 904 by the weightage value, after which the disk write may complete 905.

Note that the counts stored and incremented at block 904 can later be used in a background operation to perform DOS remediation. For example, the incremented counts can be sorted in a data structure together with the track identifier, such that those counts that exceed a threshold can be quickly accessed at a top of the sorted data structure. Traversing the data structure over the counts that exceed the threshold would provide a list of tracks which can be processed by DOS. Because the counts are incremented differently for different regions, this would result in more frequent DOS remediation for counts that had a higher weighting.

Figure 10:
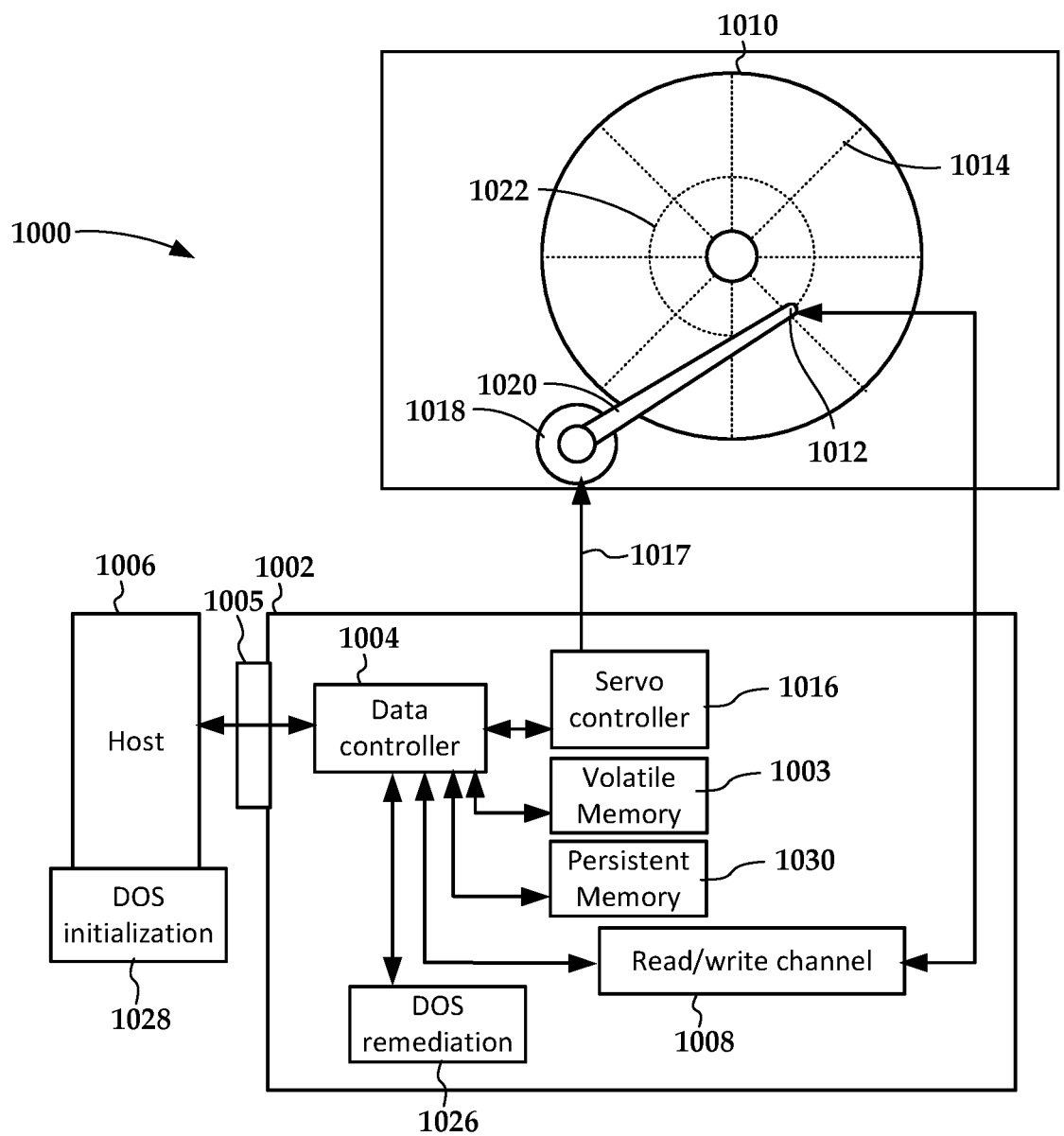
FIG. 10 is a block diagram of an apparatus according to an example embodiment.

If a system used a different DOS threshold for each zone/region instead of differently weighted counts, then a different offline scan tracking and remediation procedure may be used. An example of this is shown in FIG. 9B, which occurs in response to a disc write 910 operation. The write 910 is targeted for a logical block address range, which will correspond to one or more target tracks. Each target track position is converted 911 to a zone/region index. This index is used to find 912 the DOS threshold from the lookup table, e.g., DOS data that was created at block 802 in FIG. 8. The write count is incremented 913 and the incremented value is compared 914 to the region-specific DOS threshold found at block 912. If the count exceeds the threshold (block 914 returns 'yes'), the track is flagged 915, after which the disk write may complete 916. The flagging 915 of the track may involve, for example, setting a bit in a data structure associated with the track, copying track identification data to a special data structure reserved for DOS remediation, etc. The data used to flag the tracks can be retrieved during background scans to select tracks for remediation In FIG. 10, a block diagram illustrates a data storage apparatus 1000 according to an example embodiment. Control logic circuit 1002 of the apparatus 1000 includes a system controller 1004 that processes read and write commands and associated data from a host device 1006 which is coupled via a host interface 1005. The host device 1006 may include any electronic device that can be communicatively coupled to store and retrieve data from a data storage device, e.g., a computer, peripheral card, etc. The system controller 1004 is coupled to a read/write channel 1008 that reads from and writes to a surface of a magnetic disk 1010. The system controller 1004 is also coupled to a volatile memory 1003 (e.g., random access memory or RAM) that stores firmware instructions and system data, although in some cases non-volatile memory can be used (e.g., static RAM) for this purpose.

The read/write channel 1008 generally converts data between the digital signals processed by the controller 1004 and the analog signals conducted through one or more read/write heads 1012 during read operations. To facilitate the read operations, the read/write channel 1008 may include or be coupled to analog and digital circuitry such as preamplifiers, filters, decoders, digital-to-analog converters, timing-correction units, etc. The read/write channel 1008 also provides servo data read from servo wedges 1014 on the magnetic disk 1010 to a servo controller 1016. The servo controller 1016 uses these signals to provide a voice coil motor control signal 1017 to a VCM 1018. The VCM 1018 rotates an arm 1020 upon which the read/write heads 1012 are mounted in response to the voice coil motor control signal 1017.

Data within the servo wedges 1014 is used to detect the location of a read/write head 1012 relative to the magnetic disk 1010. The servo controller 1016 uses servo data to move a read/write head 1012 to an addressed track 1022 and block on the magnetic disk 1010 in response to the read/write commands (seek mode). While data is being written to and/or read from the disk 1010, the servo data is also used to maintain the read/write head 1012 aligned with the track 1022 (track following mode).

The disk drive 1000 includes a DOS remediation module 1026 that tracks the number of writes applied to the tracks 1022 using a counter. The module 1026 triggers remediation on tracks where adjacent track write counts exceed a DOS criterion. This remediation may involve refreshing data on affected tracks and resetting the counters appropriately. Generally, the remediation will be performed in the background (e.g., when the drive is idle), but may be moved to the foreground (e.g., mixed in with user commands) under some conditions.

A DOS initialization module 1028 is shown operating on the host 1006, which may be a factory computer or similar device. The DOS initialization module 1028 divides the disk(s) 1010 into regions, performs ATI testing on the regions to determine an appropriate DOS criterion, and stores these thresholds in a memory 1030, e.g., flash memory or a reserved portion of the disk 1010. Other configuration data, such as region-specific TPI, may be stored in this memory 1030. The module 1028 is shown operating on host 1006, where communications with the apparatus occur via the host interface 1005. It will be understood that there are other ways that the module 1028 could operate, such as via a proprietary data interface (not shown) or by transfer of the instructions to the data controller 1004, which performs the operations.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    determining an adjacent, track interference (ATI) metric for each of a plurality of regions of a single surface of a magnetic disk;
    based on the ATI metrics, assigning to each of the regions a region-specific directed offline scan (DOS) criterion, the region-specific DOS criteria comprising a first DOS criterion of a first region and a second DOS criterion of a second region, the first DOS criterion being below a system-defined minimum and the second DOS criterion being above a system-defined maximum value;
    increasing a first track spacing of the first region such that a new first DOS criterion of the first region meets or exceeds the system-defined minimum value, the increasing of the first track spacing reducing an areal density of the magnetic disk by a first amount; and
    decreasing a second track spacing of the second region to compensate for the reduction of the areal density by the first amount.

2. The method of claim 1, further comprising, based on a write count of a track within one of the regions satisfying the associated region-specific DOS criterion, performing a DOS remediation of the track, wherein the region-specific DOS criteria comprise region-specific weighted counts added to the write count of a track in response to a write operation affecting the track, the region-specific weighted counts being larger for first regions having poorer ATI performance compared to an average ATI performance and the region-specific weighted counts being smaller for second regions having better ATI performance compared to the average ATI performance.

3. The method of claim 2, wherein satisfying the region-specific DOS criteria comprises the region-specific weighted count of a target track exceeding a DOS threshold, the DOS threshold being the same for all tracks of the single surface of the magnetic disk.

4. The method of claim 1, further comprising, based on a write count of a track within one of the regions satisfying the associated region-specific DOS criterion, performing a DOS remediation of the track, wherein the DOS criterion comprises region-specific count thresholds, the region-specific count thresholds being smaller for first regions having poorer ATI performance compared to an average ATI performance and the region-specific count thresholds being larger for second tracks having better ATI performance compared to the average ATI performance.

5. The method of claim 4, wherein satisfying the region-specific DOS criteria comprises the write count of a target track exceeding the region-specific DOS threshold, the write counts being incremented by a same amount for all tracks of the single surface of the magnetic disk in response to a write operation affecting the tracks.

6. The method of claim 1, wherein
    decreasing the second track spacing results in a new second DOS criterion of the second region being less than or equal to the system-defined maximum value.

7. The method of claim 1, wherein each of the regions comprises two or more radial zones of the single surface.

8. The method of claim 7, further comprising for each of the regions, testing one of the two or more radial zones of the region to determine a sample DOS criterion, the sample DOS criterion being used as the DOS criterion for the region without testing others of the two or more radial zones.

9. The method of claim 1, further comprising, based on a write count of a track within one of the regions satisfying the associated region-specific DOS criterion, performing a DOS remediation of the track, wherein performing the DOS remediation of the track comprises re-reading the track and refreshing data of the track if the re-reading indicates degradation.

10. An apparatus, comprising:
    a channel operable to communicate with a head that reads from and writes to a single surface of a magnetic disk; and
    a controller coupled to the channel and operable to:
        determine, via the head, an adjacent track interference (ATI) metric for each of a plurality of regions of the single surface of the magnetic disk;
        based on the ATI metrics, assign to each of the regions a region-specific directed offline scan (DOS) criterion, the region-specific DOS criteria comprising a first DOS criterion of a first region and a second DOS criterion of a second re ion, the first DOS criterion being below a system-defined minimum and the second DOS criterion being above a system-defined maximum value;
        increase a first track spacing of the first region such that a new first DOS criterion of the first region meets or exceeds the system-defined minimum value, the increasing of the first track spacing reducing an areal density of the magnetic disk by a first amount; and decrease a second track spacing of the second region to compensate for the reduction of the areal density by the first amount.

11. The apparatus of claim 10, wherein the controller is further operable to, based on a write count of a track within one of the regions satisfying the associated region-specific DOS criterion, perform a DOS remediation of the track, and wherein the region-specific DOS criteria comprise region-specific weighted counts added to the write count of a track in response to a write operation affecting the track, the region-specific weighted counts being different for at least two of the regions, and wherein satisfying the region-specific DOS criteria comprises the region-specific weighted count of a target track exceeding a DOS threshold, the DOS threshold being the same for all tracks of the single surface of the magnetic disk.

12. The apparatus of claim 10, wherein the controller is further operable to, based on a write count of a track within one of the regions satisfying the associated region-specific DOS criterion, perform a DOS remediation of the track, and wherein the DOS criterion comprises region-specific count thresholds, the region-specific count thresholds being different for at least two of the regions, and wherein satisfying the region-specific DOS criteria comprises the write count of a target track exceeding the region-specific DOS threshold, the write counts being incremented by a same amount for all tracks of the single surface of the magnetic disk in response to a write operation affecting the tracks.

13. The apparatus of claim 10, wherein
decreasing the second track spacing results in a new second DOS criterion of the second region being less than or equal to the system-defined maximum value.

14. The apparatus of claim 10, wherein each of the regions comprises two or more radial zones of the single surface.

15. The apparatus of claim 10, wherein the controller is further operable to, based on a write count of a track within one of the regions satisfying the associated region-specific DOS criterion, perform a DOS remediation of the track, and wherein performing the DOS remediation of the track comprises re-reading the track and refreshing data of the track if the re-reading indicates degradation.

16. An apparatus, comprising:
a channel operable to communicate with a head that reads from and writes to a single surface of a magnetic disk; and
a controller coupled to the channel and operable to:
divide a surface of the magnetic disk into a plurality of zone groups, each of the zone groups comprising a plurality of zones;
determine, via the head, an adjacent track interference (ATI) metric for each of the plurality of zones of the single surface of the magnetic disk;
based on the ATI metrics, assign to each of the zone groups a region-specific directed offline scan (DOS) criterion corresponding to a lowest performing zone the zone group, at least two of the region-specific DOS criteria being different from one another; and
during end-user operation of the apparatus, perform a DOS remediation of a track based on a write count of the track within one of the zone groups satisfying the associated region-specific DOS criterion.

17. The apparatus of claim 16, wherein the controller is further operable to:
determine that a first DOS criterion of a first zone group is below a system-defined minimum value;
increase a track spacing of the first zone group resulting in a new first DOS criterion of the first zone group meeting or exceeding the system-defined minimum value, the increasing of the first track spacing reducing an areal density of the magnetic disk by a first amount;
determine a DOS criterion of a second zone group is above a system-defined maximum value; and
decrease a second track spacing of the second zone group to compensate for the reduction of the areal density by the first amount.

18. The apparatus of claim 16, wherein
decreasing the second track spacing results in a new second DOS criterion of the second zone group being less than or equal to the system-defined maximum value.

* * * * *

UNITED STATES PATENT AND TRADEMARK OFFICE
CERTIFICATE OF CORRECTION

PATENT NO. : 11,360,671 B2
APPLICATION NO. : 16/935527
DATED : June 14, 2022
INVENTOR(S) : Jian Qiang et al.

Page 1 of 1

It is certified that error appears in the above-identified patent and that said Letters Patent is hereby corrected as shown below:

In the Claims

In Claim 1 Line 47, 'adjacent,' should be -- adjacent --.

In Claim 10 Line 61, 're ion' should be -- region --.

Signed and Sealed this
Eleventh Day of April, 2023

Katherine Kelly Vidal
*Director of the United States Patent and Trademark Office*